US010322353B1

(12) United States Patent
Goergen et al.

(10) Patent No.: US 10,322,353 B1
(45) Date of Patent: Jun. 18, 2019

(54) SYSTEMS AND METHODS FOR DYNAMIC RIDE PROFILES

(71) Applicant: Universal City Studios LLC, Universal City, CA (US)

(72) Inventors: Patrick J. Goergen, Orlando, FL (US); Danielle Holstine, Winter Garden, FL (US); Patrick Boyle, Orlando, FL (US); Jack Joseph Colletta, Orlando, FL (US); Martin Evan Graham, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/126,450

(22) Filed: Sep. 10, 2018

Related U.S. Application Data

(60) Provisional application No. 62/671,940, filed on May 15, 2018.

(51) Int. Cl.
| H04W 4/80 | (2018.01) |
| A63G 31/16 | (2006.01) |
| G02B 27/00 | (2006.01) |
| G05B 19/05 | (2006.01) |
| G06T 19/00 | (2011.01) |

(52) U.S. Cl.
CPC ......... *A63G 31/16* (2013.01); *G02B 27/0093* (2013.01); *G05B 19/05* (2013.01); *G06T 19/003* (2013.01); *G06T 19/006* (2013.01); *H04W 4/80* (2018.02)

(58) Field of Classification Search
CPC ........ A63G 31/16; A63G 25/00; A63G 31/00; B06T 19/003; G06T 19/006; B60W 50/10; B60W 10/18; H04W 4/80; G02B 27/0093; G05B 19/05
USPC ............................ 472/59, 29, 43; 104/53, 77
See application file for complete search history.

(56) References Cited

U.S. PATENT DOCUMENTS

| 5,403,238 | A | | 4/1995 | Baxter et al. |
| 5,583,844 | A | | 12/1996 | Wolf et al. |
| 6,079,982 | A | * | 6/2000 | Meader ............... A63F 13/08 434/29 |
| 6,796,908 | B2 | | 9/2004 | Weston |
| 8,388,458 | B2 | | 3/2013 | Buhler |
| 9,526,997 | B2 | * | 12/2016 | McVeen ............. A63G 31/16 |
| 9,581,819 | B1 | * | 2/2017 | Boggs ............... G02B 27/0172 |
| 9,889,860 | B2 | | 2/2018 | Osterman et al. |

(Continued)

*Primary Examiner* — Michael D Dennis
(74) *Attorney, Agent, or Firm* — Fletcher Yoder, P.C.

(57) ABSTRACT

Present embodiments are directed toward a dynamic control system for an amusement park ride. The system includes a game server that generates game data describing movement of a virtual vehicle through a virtual environment; a programmable logic controller (PLC) configured to conditionally execute instructions of a dynamic ride profile relative to one or more stored limits to operate physical actions of the ride vehicle; and a dynamic ride profile server communicatively coupled to the game server and the PLC. The dynamic ride profile server is configured to: receive input data, sensor data, and the game data; provide the received data as inputs to one or more physical models to generate a portion of a dynamic ride profile based on the movement of the virtual vehicle through the virtual environment; and provide the portion of the dynamic ride profile to the PLC for conditional execution.

20 Claims, 3 Drawing Sheets

(56) References Cited

U.S. PATENT DOCUMENTS

| | | | |
|---|---|---|---|
| 9,943,769 B2 | 4/2018 | Comploi | |
| 2007/0089633 A1 | 4/2007 | Kovac | |
| 2009/0125161 A1* | 5/2009 | Baur | G09B 19/0038 701/1 |
| 2011/0010618 A1* | 1/2011 | Crawford | G06F 3/016 715/702 |
| 2013/0012327 A1* | 1/2013 | Schreibfeder | A63G 31/00 472/2 |
| 2013/0032053 A1* | 2/2013 | Stoker | A63G 7/00 104/69 |
| 2013/0145953 A1* | 6/2013 | Crawford | A63G 31/16 104/28 |
| 2015/0190726 A1* | 7/2015 | Frolov | A63F 13/837 472/61 |
| 2015/0360127 A1* | 12/2015 | Boyle | A63F 13/55 463/31 |
| 2017/0225084 A1* | 8/2017 | Snyder | A63G 7/00 |
| 2018/0247557 A1* | 8/2018 | Brice | G09B 9/04 |

\* cited by examiner

SYSTEMS AND METHODS FOR DYNAMIC RIDE PROFILES

CROSS-REFERENCE TO RELATED APPLICATION

This application claims priority from and the benefit of U.S. Provisional Application No. 62/671,940, entitled "SYSTEMS AND METHODS FOR DYNAMIC RIDE PROFILES," filed May 15, 2018, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various amusement rides have been created to provide passengers with unique motion and visual experiences. For example, theme rides can be implemented with single-passenger or multi-passenger ride vehicles that travel along a fixed or variable path. Ride vehicles themselves may include features providing passengers with varying levels of control (e.g., various buttons and knobs) over the ride vehicle and/or surrounding environment. However, traditional controls given to passengers of a ride vehicle are generally limited when the ride vehicle follows a predetermined, fixed path. Accordingly, it is now recognized that there is a need for an improved amusement ride that provides enhanced passenger control over the ride vehicle to create a more adventurous ride experience.

For certain amusement park rides, vehicle movements are constrained to programmed profiles (e.g., animations) that are embedded in a programmable logic controller (PLC) of the vehicle. However, it is presently recognized that these programmed profiles are substantially static and, as such, are not updated or modified based on passenger interactions with the vehicle and/or based on realistic physics models. As a result, a passenger of the ride may feel like the ride is staged or unrealistic, which may limit passenger engagement and amusement. Additionally, it is also recognized that PLCs are not capable of performing extensive calculations, such as those used in complex physics models. That is, while PLCs are adept at quickly responding to a parameter change to a value that is beyond a predetermined threshold, PLC processors typically have a lower clock speed (e.g., 200 Hz) compared to other types of processors, such as central processing units (CPUs) and graphical processing units (GPUs) of modern computers. Furthermore, PLC programming and debugging can be difficult, tedious, and expensive. Accordingly, it is now recognized that, when a ride is designed using PLCs alone to determine and generate a passenger's experience, this can severely limit the ride's ability to immerse a passenger in an experience that feels true to a realistic physics model.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Present embodiments are directed toward a dynamic control system for an amusement park ride. The system includes a game server configured to generate game data that describes movement of a virtual vehicle through a virtual environment; a programmable logic controller (PLC) configured to conditionally execute instructions of a dynamic ride profile relative to one or more stored limits to operate physical actions of the ride vehicle; and a dynamic ride profile server communicatively coupled to the game server and the PLC. The dynamic ride profile server is configured to: receive input data, sensor data, and the game data; provide the input data, the sensor data, and the game data as inputs to one or more physical models to generate a portion of a dynamic ride profile based on the movement of the virtual vehicle through the virtual environment; and provide the portion of the dynamic ride profile to the PLC for conditional execution.

Present embodiments are also directed toward an amusement park ride having a game server configured to generate game data that includes a virtual environment. The ride has a ride vehicle communicatively coupled to the game server and configured to move passengers along a ride path, wherein the ride vehicle includes: one or more output devices configured to present the virtual environment to the passengers of the ride vehicle based on the game data generated by the game server; one or more input devices configured to collect input data from the passengers of the ride vehicle; one or more sensors configured to collect sensor data during operation of the ride vehicle; and a programmable logic controller (PLC) communicatively coupled to the one or more input devices and the one or more sensors, wherein the PLC is configured to receive and conditionally execute instructions of a dynamic ride profile relative to one or more stored limits to operate physical actions of the ride vehicle. The ride includes a dynamic ride profile server communicatively coupled to the game server and the PLC, wherein the dynamic ride profile server is configured to: receive the input data and the sensor data via the PLC and receive the game data from the game server; provide the input data, the sensor data, and the game data as inputs to one or more physical models to generate a portion of the dynamic ride profile; and provide the portion of the dynamic ride profile to the PLC for conditional execution.

Present embodiments are also directed toward a method of controlling an amusement park ride. The method includes: receiving input data from one or more input devices of a ride vehicle of the amusement park ride; receiving sensor data from one or more sensors of the amusement park ride; and receiving game data from a game server of the amusement park ride, wherein the game data describes movement of a virtual vehicle through a virtual environment. The method also includes providing the input data, the sensor data, and the game data as inputs to one or more physical models to generate a portion of a dynamic ride profile based on the movement of the virtual vehicle through the virtual environment. The method further includes providing the portion of the dynamic ride profile to a communicatively coupled PLC of the ride vehicle, wherein the PLC of the ride vehicle is configured to conditionally execute the portion of the dynamic ride profile during operation of the ride to physically move the ride vehicle based on one or more stored limits of the PLC.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed to a dynamic control system that is designed to control vehicle movements of an amusement park ride. The dynamic control system includes a dynamic ride profile server that is communicatively coupled to a PLC of the ride vehicle and that provides instructions to the PLC to adjust the movement of the ride vehicle based on a combination of sensed parameters, physics models, game feedback, and passenger interactions. As such, the dynamic control system enables the ride to provide realistic simulation movements that improve passenger engagement and amusement. Additionally, to ensure proper operation of the ride vehicles, the PLC maintains a set of limits and does not allow the vehicle to perform movements that go beyond these limits, regardless of the instructions received from the dynamic ride profile server. Furthermore, the disclosed dynamic control system enables rides that include enhanced interaction with the simulated environment (e.g., drag, wind gusts, precipitation), as well as enhanced simulated interaction between multiple vehicles (e.g., drafting, collisions), in accordance with physics models of the dynamic ride profile server.

Figure 1:
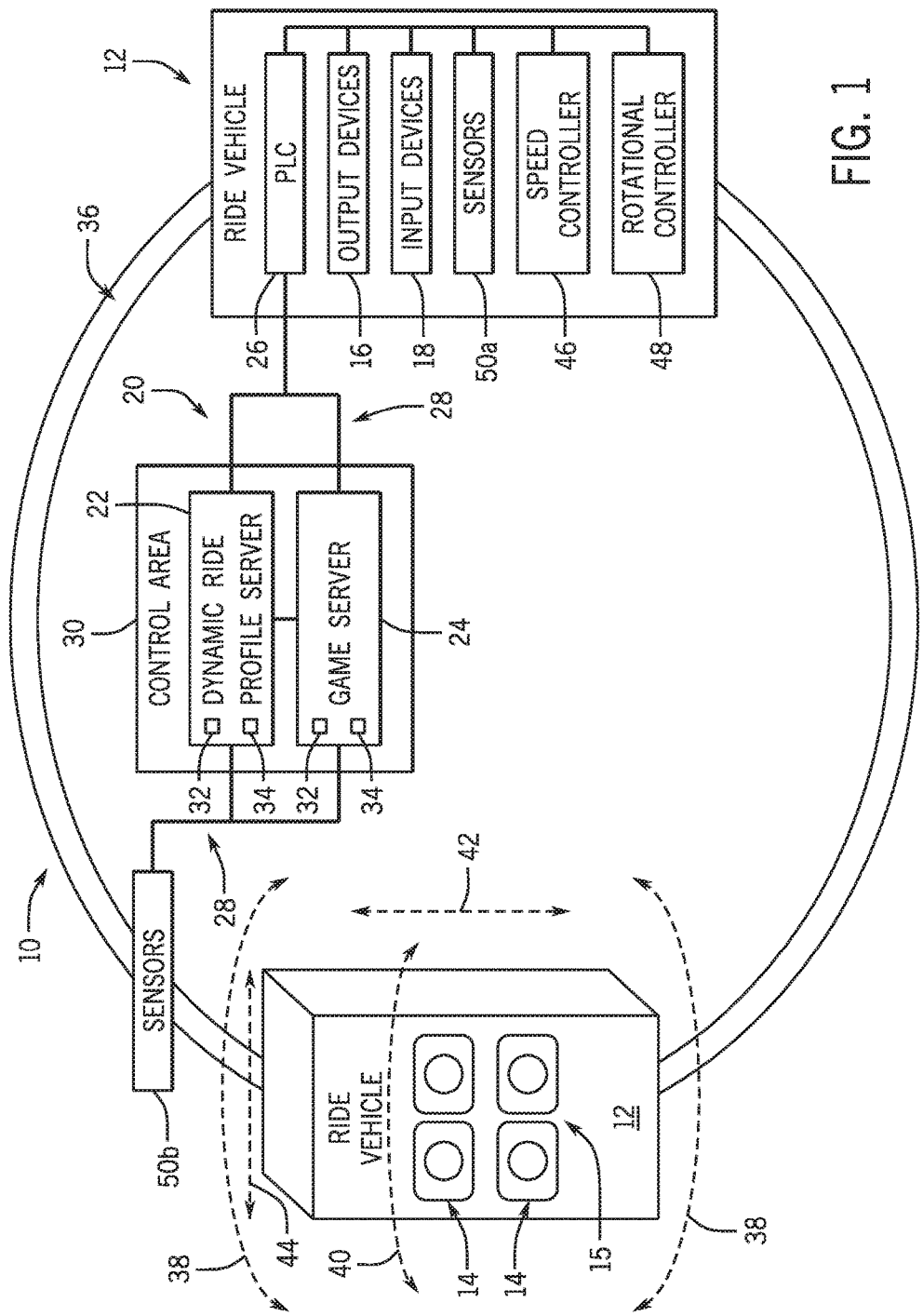
FIG. 1 is a schematic diagram illustrating an amusement park ride having a dynamic control system, in accordance with embodiments of the present approach.

The disclosed dynamic control system is discussed below in the context of an example amusement park ride 10, namely a dark ride that includes two ride vehicles 12, as illustrated in FIG. 1. It should be appreciated that the disclosed dynamic control system may be used in combination with other types of rides and ride vehicles, or using any suitable number of vehicles (e.g., 3, 4, 5, 6, or more). For the illustrated embodiment, the ride vehicles 12 are substantially the same; however, the ride vehicles 12 are differently illustrated in FIG. 1 to more clearly illustrate different aspects (e.g., components and motion) of the ride vehicles 12.

For the embodiment illustrated in FIG. 1, passengers 14 are presented with an augmented or completely virtual environment 15 from within the ride vehicle. More specifically, in the illustrated embodiment, each ride vehicle 12 includes a number of output devices 16. For example, the output devices 16 may include any suitable number of displays (e.g., mounted to the interior of the vehicles, head-mounted displays), speakers, haptic feedback devices (e.g., rumble/vibration feedback devices, acoustic or ultrasonic haptic devices), physical effects devices (e.g., devices that generate hot or cold bursts of air, devices that generate bursts of mist). In other embodiments, each of the ride vehicles 12 may include other suitable output devices 16, or other combinations of output devices 16, in accordance with the present disclosure.

Additionally, for the embodiment illustrated in FIG. 1, each of the ride vehicles 12 includes a number of input devices 18. For example, these input devices 18 may include buttons (e.g., ignition buttons), steering devices (e.g., steering wheels, joysticks), control pedals (e.g., brake pedals, accelerator pedals, clutch pedals), gear shifts, and/or brake levers. These input devices 18 may additionally or alternatively include a head and/or eye tracking system that monitors passenger head/eye position to collect steering input from the passengers 14. In other embodiments, each of the ride vehicles 12 may include other input devices 18, or other combinations of input devices 18, in accordance with the present disclosure. In certain embodiments, each of the passengers 14 may have a respective set of input devices 18, while in other embodiments, each of the passengers 14 may have a complementary portion of input devices 18 that are used in a cooperative manner.

Additionally, the ride 10 illustrated in FIG. 1 includes the dynamic control system 20, which is designed to control movements of the ride vehicles 12 in accordance with a dynamic ride profile, as discussed in greater detail below. More specifically, the illustrated dynamic control system 20 includes a number of components, such as a dynamic ride profile server 22, a game server 24, and a respective PLC 26 of each of the ride vehicles 12, communicatively coupled together via a network 28. While the network 28 may be wireless in certain embodiments, it is noted that a wired network generally enables lower latency communication, which can improve performance of the ride 10.

A "game server," as used herein, and as discussed in greater detail below, refers to a computing device or a collection of computing devices (e.g., physical computing devices or virtual computing nodes) generally responsible for managing a video game aspect of the ride 10. As such, the game server 24 is programmed to generate a virtual environment (e.g., a virtual 3D space) in which virtual vehicles are designed to move. A "virtual vehicle," as used herein, refers to a video game entity or element of the virtual environment that has particular attributes (e.g., speed, position, health/damage, fuel, appearance) that are maintained by the game server 24. For example, a virtual vehicle is associated with each of the physical ride vehicles 12. In certain embodiments, additional virtual vehicles (e.g., non-playable characters/vehicles) may be present within the virtual environment as well.

For example, in an embodiment, the ride 10 may be a racing simulator, and as such, the game server 24 generates and maintains a virtual environment that describes the nature of the race track that virtual vehicles are traversing, the relative speed and position of the virtual vehicles, interactions between the virtual vehicles, attributes (e.g., performance upgrades, health, bonuses, score) associated with the virtual vehicles, and so forth. Furthermore, the game server 24 generates content (e.g., video content, audio content) delivered to the ride vehicles 12 and output by the output devices 16 to yield the virtual environment 15 that is presented to the passengers 14. For example, in an embodiment, video content presented by display devices of the ride vehicles 12 is content that corresponds to different perspective views generated within the virtual environment hosted by the game server 24.

A "dynamic ride profile server," as used herein, and as discussed in greater detail below, refers to a computing device or a collection of computing devices (e.g., physical computing devices or virtual computing nodes) generally responsible for determining how the physical ride vehicles 12 should move based on a number of different input data and one or more physics models. As discussed, these inputs include information received from the game server 24 that indicates or describes what is happening to each corresponding virtual vehicle in the virtual environment, such as how the virtual vehicles move in response to a texture or incline of the race track, how the virtual vehicles respond to environmental hazards (e.g., rain, standing water, ice), how the virtual vehicle interact one another, and so forth. Additionally, in certain embodiments, the dynamic ride profile server 22 additionally receives input data from the input devices 18 and/or various sensors of the ride 10. As discussed below, the dynamic ride profile server 22 provides the received data as inputs to one or more physical models that describe how the physical ride vehicles 12 should move to correspond with what is happening in the virtual environment 15 that is presented to the passengers 14. In this manner, the dynamic ride profile server 22 generates a dynamic ride profile that instructs each of the ride vehicles 12 how to move to match what is being presented to the passengers 14 by the game server 24, as well as the inputs received from the input devices 18.

For the illustrated embodiment, the dynamic ride profile server 22 and the game server 24 generally reside in a control area 30 of the ride, while the PLCs 26 are disposed within the ride vehicles 12. In other embodiments, it is envisioned that the dynamic control system 20 may be disposed substantially or entirely within one or more ride vehicles 12. In certain embodiments, the dynamic ride profile server 22 and the game server 24 may be hosted by distinct physical computing devices, or may exist as virtual server instances hosted by a common physical computing device. The one or more computing devices that host these servers generally include suitable memory 32 capable of storing instructions and data, as well as suitable processing circuitry 34 capable of executing these stored instructions to provide the functionality set forth herein.

For the embodiment of the ride 10 illustrated in FIG. 1, each of the ride vehicles 12 is designed to travel along a relatively restricted track or ride path 36 during operation. It may be appreciated that, in certain embodiments, a ride path 30 may only be loosely defined by a set of physical or virtual boundaries, enabling greater freedom of movement for the ride vehicles 12 than a traditional track. However, the ride 10 is designed to modify operation (e.g., position or motion) of the ride vehicles 12 based on control signals from the dynamic control system 20. Accordingly, in addition to producing effects in the virtual environment 15 that is presented to the passengers 14, the input devices 18 also provide inputs that can trigger real-world effects, including changing the operation of the vehicles 12 within a predefined set of limits. As discussed in greater detail below, the disclosed dynamic ride profile server 20 can provide control signals to modify vehicle yaw (as represented by arrows 38), tilt angle (as represented by arrow 40), ride path location (e.g., displacement 42 along the ride path 36, displacement 44 with respect to boundaries of the ride path 36), speed (e.g., rate of displacement 42 along the ride path 36, rotational rate), or any other suitable parameter of the vehicles 12, in accordance with a physics-based dynamic ride profile that takes passenger inputs into account. That is, embodiments of the dynamic ride profile server 20 can provide control signals to modify one or more of a position of the ride vehicles 12 along the ride path 36, a rotational position of the vehicles 12, and/or provoke any other suitable free form movement along one or more axes (e.g., along six degrees of freedom). This generally enables the ride vehicles 12 to move in a manner that is consistent with what is being presented in the virtual environment 15, producing an immersive experience for the passengers 14, as discussed in greater detail below. Additionally, as discussed below, to ensure proper operation of the vehicles 12 and the ride 10, the PLCs 26 of the vehicles 12 are designed to receive the control signals from the dynamic ride profile server 22 and only implement the control signals when they fall within limits predefined within the PLCs 26. These limits may include special scenarios outside of normal operating parameters (e.g., maintenance or alarm conditions)

For the embodiment illustrated in FIG. 1, the dynamic control system 20 includes a number of vehicle controllers that are communicatively coupled to the PLCs 26 of the vehicles 12, including a ride vehicle speed controller 46 and a ride vehicle rotation controller 48. The illustrated dynamic control system 20 also has a number of sensors 50, including sensors 50A that are communicatively coupled to the dynamic ride profile server 22 and the game server 24 via the PLCs 26, as well as sensors 50B that are communicatively coupled to the dynamic ride profile server 22 and the game server 24 via the network 28. These sensors 50 may include positional sensors (e.g., proximity detectors, radio-frequency identification (RFID) sensors, cameras, light detection and ranging (LIDAR) sensors), velocimeters, accelerometers, gyroscopes, revolutions per minute (RPM) sensors, voltage/current sensors, or other suitable sensors capable of measuring a parameter of the vehicles 12, the passengers 14, and/or the ride 10. For the illustrated embodiment, the PLCs 26 are communicatively coupled to the input devices 18 to receive input from the passengers 14 and to provide this input to the dynamic ride profile server 22 and the game server 24. Similarly, the PLCs 26 are communicatively coupled to the output devices 16 to present the virtual environment 15 to the passengers 14 based on control signals from the dynamic ride profile server 22 and the game server 24.

For the illustrated embodiment, the dark ride 10 includes a video game aspect. That is, the ride 10 presents information to passengers 14 depicting the virtual environment 15, and receives input from the passengers 14 that determines the performance (e.g., vehicular movement, score) of the passengers 14 in the virtual environment. For example, the game server 24 may provide, to the output devices 16 of the ride vehicles 12, audio/visual information (e.g., video content, sound effects, music, virtual reality (VR) content, augmented reality (AR) content) pertaining to the video game aspect of the ride 10. Additionally, the game server 24 is designed to receive input from sensors 50 of the dynamic control system 20 and/or from input devices 18 associated with the ride vehicles 12, and, in response, update the audio/visual information presented to the passengers 14.

As discussed, the dynamic ride profile server 22 is designed to determine suitable movements for the ride vehicles 12 that make the ride experience feel like the vehicles are actually moving through the virtual environment 15 being presented to the passengers 14 of the vehicle by the game server 24. Accordingly, the dynamic ride profile server 22 is designed to receive and process information from other components of the system (e.g., game server 24, input devices 18, sensors 50) and apply suitable physics models to determine dynamic ride profiles, which include instructions regarding how the vehicles 12 should be manipulated to provide a realistic physical experience that corresponds to the virtual environment 15, and is responsive with respect to inputs provided by the passengers 14 via the input devices 18. For example, in certain embodiments, the dynamic ride profile server 22 is configured to adjust dynamic ride profiles, and thereby, the movement of the ride vehicles 12, to account for changes in physical models (e.g., corresponding to movement through different media), differences in weight among passengers 14, physical limitations of passengers 14, and interactions between two or more passengers 14 in the same or different ride vehicles 12.

Figure 2:
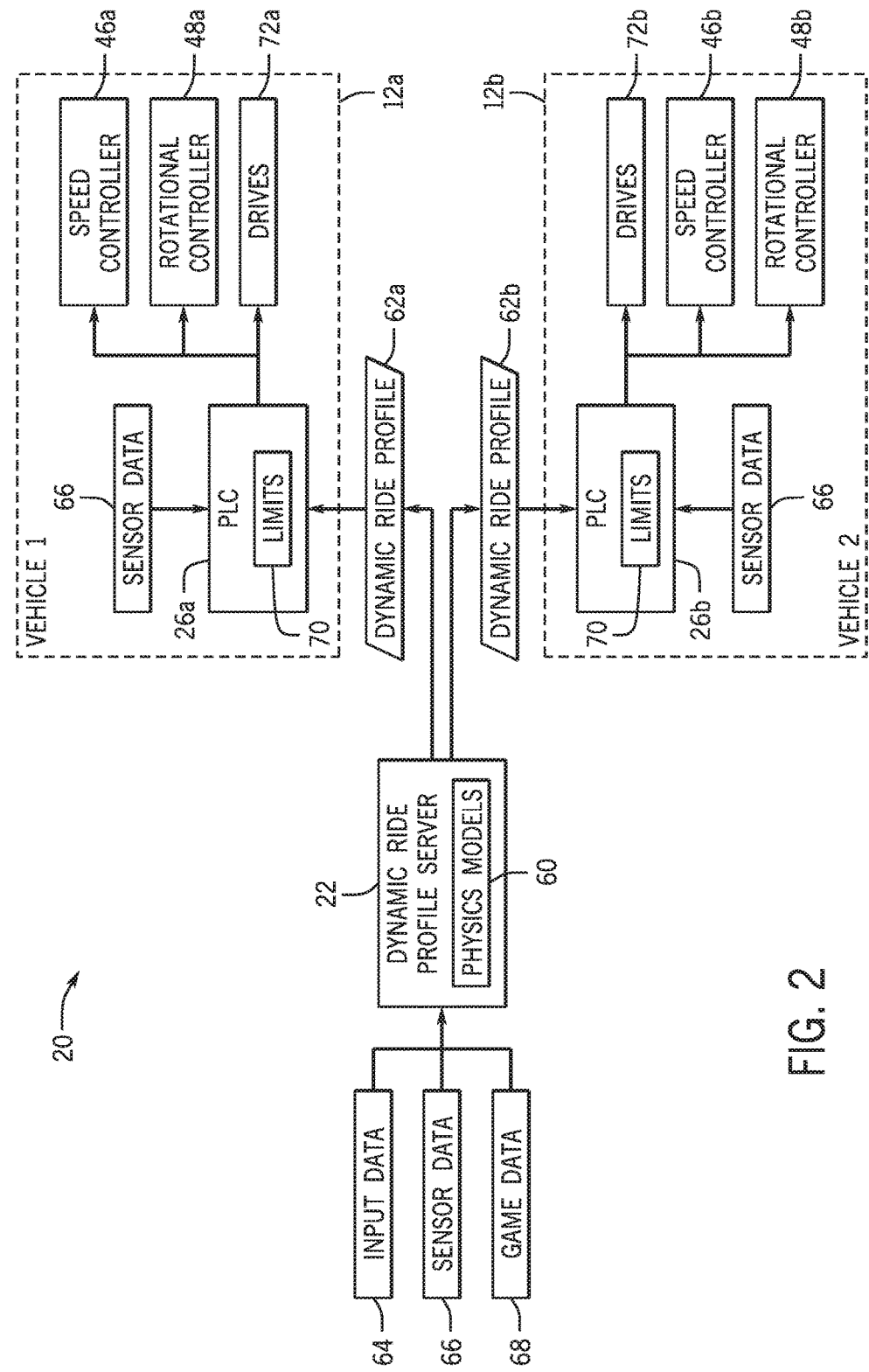
FIG. 2 is a schematic diagram illustrating the flow of information within the embodiment of the dynamic control system illustrated in FIG. 1, in accordance with embodiments of the present approach.

FIG. 2 is a schematic illustrating the flow of information within the embodiment of the dynamic control system 20 illustrated in FIG. 1, as is discussed with reference to elements illustrated in FIGS. 1 and 2. As illustrated in FIG. 2, the dynamic ride profile server 20 includes (e.g., stores in memory 32) a number of physics models 60. For example, these physics models 60 may include models that define how virtual vehicles (which correspond to the ride vehicles 12) move through the virtual environment 15, such as along a smooth or laminar path, moving along a bumpy or turbulent path, sliding or drifting, or transitioning between different media (e.g., moving between air and water). The physics models 60 may also include models that describe how two or more virtual vehicles interact with and affect one another (e.g., via drafting, collisions, missile attacks) within the virtual environment 15 that is presented to the passengers 14. Additionally, the dynamic ride profile server 22 is capable of combining multiple models together when processing the received data to generate dynamic ride profiles 62A and 62B, which are respectively provided to the ride vehicles 12A and 12B as a series of instructions or control signals that define the ride experiences for the passengers 14 of both vehicles.

As illustrated in FIG. 2, the dynamic ride profile server 22 receives and consumes a variety of data to generate dynamic ride profiles 62A and 62B, which are then provided to the PLCs 26A and 26B of the first and second ride vehicles 12A and 12B, respectively, for conditional execution. For the illustrated embodiment, the consumed data includes passenger input data 64 received via the input devices 18, as well as sensor data 66 received from sensors 50 directly or indirectly communicatively coupled to the dynamic ride profile server 22 via the network 28, as discussed above. Additionally, for the illustrated embodiment, the consumed data also includes game data 68 received from the game server 24 that describes what is happening in the virtual environment to the virtual vehicles associated with each of the ride vehicles 12A and 12B. The dynamic ride profile server 22 receives and processes this data together, feeding this data as inputs to the one or more physics models 60, to generate the instructions of the dynamic ride profiles 62A and 62B, which are delivered to the PLCs 26A and 26B of the ride vehicles 12A and 12B. It may be appreciated that since these dynamic ride profiles are based, at least in part, on the input data 64 received from passengers 14 during operation of the ride 10, the dynamic ride profiles are generated and delivered to the ride vehicles 12 in a serialized or piecewise manner throughout the operation of the ride 10.

However, it may be appreciated that the PLCs 26A and 26B of the first and second vehicles 12A and 12B do not unconditionally execute the instructions of the dynamic ride profiles 62 received from the dynamic ride profile server 22. That is, as illustrated, each of the PLCs 26 stores a number of limits 70 that define thresholds for normal or acceptable operation of the ride vehicles 12. For example, these limits 70 may include a maximum/minimum speed limit, an acceleration limit, a yaw limit, a tilt limit, a current/voltage limit, a torque limit, a minimum intravehicular distance, or any other limit that defines the normal and desired operation of the vehicles 12 and the ride 10. Additionally, as illustrated, each of the PLCs 26 also receives and processes a portion of the sensor data 66 (e.g., collected by sensors 50A illustrated in FIG. 1), which is used by the PLCs to enforce the limits 70, as discussed below.

As such, "conditional execution," as used herein, refers to PLCs 26 receiving dynamic ride profiles 62 from the dynamic ride profile server 22, wherein, before executing instructions of the profiles, each of the PLCs 26 ensures that executing the instructions in these profiles would not put the ride vehicles 12 or the ride 10 into a state that is beyond the limits 70 stored by the PLCs 26. For example, the PLCs 26A and 26B do not provide or are prevented from providing control signals to the ride vehicle speed controllers 46A and 46B or the ride vehicle rotational controllers 48A and 48B that are beyond the predefined limits 70 (e.g., beyond the bounds of an envelope defined by the limits 70 in combination). Similarly, the PLCs 26A and 26B do not provide or are prevented from providing respective control signals to directly coupled drives 72A or 72B that are beyond these predefined limits 70. Accordingly, it may be appreciated that the experience of the ride is largely dominated by the dynamic ride profile server 22 (which has substantially greater processing power to generate a physically realistic experience), while the PLCs 26 (which have substantially less processing power, but are designed to ensure real-time parameter compliance) enforces the limits 70 to ensure proper operation of the ride 10.

Figure 3:
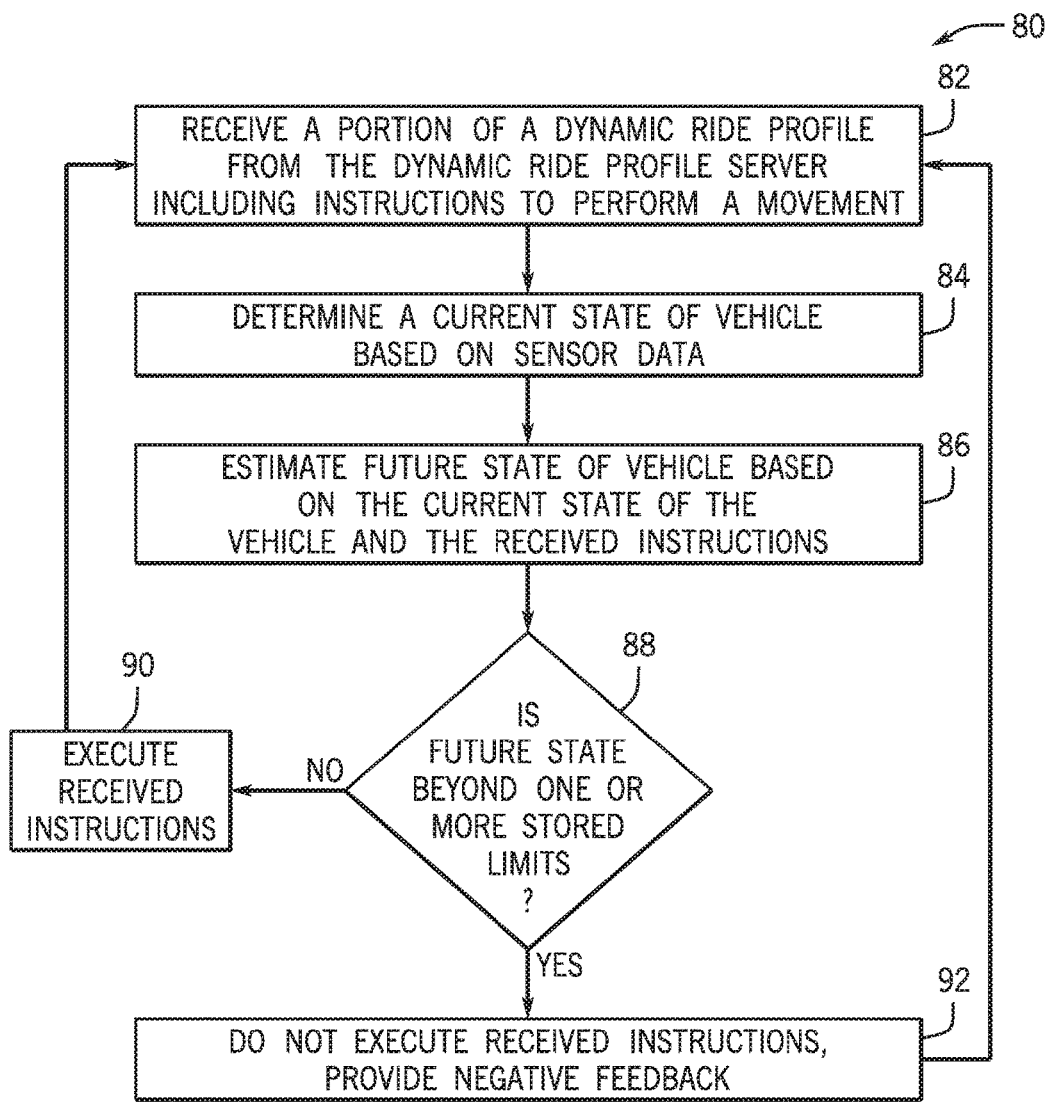
FIG. 3 is a flow diagram illustrating an embodiment of a process whereby the PLC of a ride vehicle receives and conditionally executes instructions of a dynamic ride profile, in accordance with embodiments of the present approach.

FIG. 3 is a flow diagram illustrating an embodiment of a process 80 whereby a PLC (e.g., PLC 26A of ride vehicle 12A of FIG. 2) receives and conditionally executes instructions of the dynamic ride profiles 62A. The illustrated process 80 begins with the PLCs 26A receiving (block 82) a portion of the dynamic ride profile 62A from the dynamic ride profile server 22 via the network 28, wherein the received portion of the profile includes one or more instructions or control signals to perform particular vehicular movements. For example, the instructions of the dynamic ride profile 62A may include instructions to modify operation of the ride vehicle speed controller 46A and/or the ride vehicle rotational controller 48A, as illustrated in FIG. 2, to change a speed or rotational position of the vehicle 12A.

In response, as illustrated in FIG. 3, the PLC 26A determines (block 84) a current state of the vehicle 12A based on received sensor data. For example, as mentioned, the PLC 26A receives sensor data 66 from the communicatively coupled sensors 50A, and the PLC 26A utilizes this data to determine a current state (e.g., location, position, speed, acceleration) of the ride vehicle 12A. The PLC 26A also estimates (block 86) a future state of the vehicle 12A based on the current state of the vehicle 12A and the instructions received as part of the dynamic ride profile 62A from the dynamic ride profile server 22. The PLC 26A then determines (block 88) whether the estimated future state is beyond one or more of the limits 70 stored by the PLC 26A. When the PLC 26A determines in block 88 that the future state is not beyond one or more of the limits 70, the PLC 26A executes (block 90) the instructions of the portion of the dynamic ride profile 62A. However, when the PLC 26A determines in block 88 that the estimated future state is beyond at least one of the stored limits 70, the PLC 26A disregards (block 92) the instructions and, in certain embodiments, additionally provides negative feedback to the dynamic ride profile server 22 that the instructions of the dynamic ride profile 62A could not be executed. In response to received negative feedback, the dynamic ride profile server 22 may adjust future instructions in a subsequent dynamic ride profile 62A generated for the ride vehicle 12A to try to avoid reaching the limits 70.

In an example, the disclosed dynamic control system 20 controls the driving/racing simulator amusement park ride 10. During operation of the ride 10, a virtual vehicle, corresponding to the ride vehicle 12A, transitions from moving though lower viscosity or lower density medium (e.g., air) to moving through higher viscosity or higher density medium (e.g., water). In advance of the transition, the dynamic ride profile server 22 receives information about the upcoming transition as part of the game data 68 received from the game server 24, and determines instructions for the dynamic ride profile 68A at the transition by implementing a change in physics models 60 as the virtual vehicle switches virtual media. As a result of simulated enhanced drag after the transition, the ride vehicle 12A may experience a sudden deceleration followed by drifting movements, buoyant/floating movements, and so forth, that are indicative of movement of the virtual vehicle through water in the virtual environment 15, all within the bounds of the predefined limits 70.

In another example, the disclosed dynamic control system 20 controls at least two ride vehicles (e.g., ride vehicle 12A and 12B) and the virtual vehicles that correspond to the ride vehicles can interact with one another in the driving/racing simulator amusement park ride 10. For example, while the two physical vehicles are substantially prevented (e.g., based on the limits 70 stored by the PLCs 26, based on physical barriers) from physically interacting with one another, the disclosed dynamic control system 20 can enable the corresponding virtual vehicles to interact with one another in the shared virtual environment 15. For example, when one vehicle is positioned in front of another vehicle in the virtual environment 15, the dynamic ride profile server 22 utilizes one of the stored physics models 60 to enable the generated dynamic ride profiles 62 to account for drafting effects induced on the trailing virtual vehicle by the lead virtual vehicle. In certain embodiments, one virtual vehicle can virtually collide with a second vehicle in the virtual environment, and the dynamic ride profile server 22 may utilize one of the stored physics models 60 that enables the generated dynamic ride profiles 62 to provide appropriate movement of the vehicles to correspond with this collision, while actual physical contact between the vehicles is prevented. Additionally, in certain embodiments, one virtual vehicle can virtually attack a second vehicle in the virtual environment (e.g., by launching a projectile attack/weapon), and the dynamic ride profile server 22 may utilize one of the stored physics models 60 that enables the generated dynamic ride profile to provide appropriate movement of the vehicles to correspond with the launch and/or contact of the projectile. Again, all of these generated dynamic ride profiles would be conditionally executed by the PLCs 26 of the ride vehicles 12 in accordance with the predefined limits 70 to ensure proper operation of the ride 10.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A dynamic control system for controlling an amusement park ride, comprising:
   a game server configured to generate game data that describes movement of a virtual vehicle through a virtual environment;
   a programmable logic controller (PLC) of a ride vehicle configured to receive and conditionally execute instructions of a dynamic ride profile relative to one or more stored limits to operate physical actions of the ride vehicle;
   a dynamic ride profile server communicatively coupled to the game server and the PLC, wherein the dynamic ride profile server is configured to:
      receive input data from one or more input devices, sensor data from one or more sensors, and the game data from the game server;
      provide the input data, the sensor data, and the game data as inputs to one or more physical models to generate a portion of a dynamic ride profile based on the movement of the virtual vehicle through the virtual environment; and
      provide the portion of the dynamic ride profile to the PLC for conditional execution.

2. The system of claim 1, comprising the one or more sensors communicatively coupled to the dynamic ride profile server and configured to collect sensor data during operation of the amusement park ride.

3. The system of claim 2, wherein a first portion of the one or more sensors are communicatively coupled to the dynamic ride profile server via the PLC and a network, and wherein a second portion of the one or more sensors are communicatively coupled to the dynamic ride profile server via the network.

4. The system of claim 1, comprising the one or more input devices communicatively coupled to the dynamic ride profile server and the game server, wherein the one or more input devices are configured to collect input data from a passenger of the amusement park ride and provide the input data to the dynamic ride profile server and the game server.

5. The system of claim 1, comprising a second PLC of a second ride vehicle configured to receive and conditionally execute instructions of a second dynamic ride profile relative to one or more stored limits to operate the second ride vehicle, wherein the game data also defines movement of a second virtual vehicle through the virtual environment, and wherein the dynamic ride profile server is configured to:

provide the input data, the sensor data, and the game data as inputs to one or more physical models to generate a portion of a second dynamic ride profile based on the movement of a second virtual vehicle through the virtual environment; and provide the portion of the second dynamic ride profile to the second PLC for conditional execution.

6. The system of claim 5, wherein the one or more stored limits of the PLC or the second PLC comprise a maximum/minimum speed limit, an acceleration limit, a yaw limit, a tilt limit, a current/voltage limit, a torque limit, a minimum intravehicular distance, or a combination thereof.

7. The system of claim 5, wherein the game data describes interactions between the virtual vehicle and the second virtual vehicle in the virtual environment, wherein the interactions comprise drafting effects, collisions, or projectile attacks.

8. The system of claim 7, wherein the one or more physical models define how the ride vehicle and the second ride vehicle should move in response to the interactions.

9. An amusement park ride, comprising:
a game server configured to generate game data that includes a virtual environment;
a ride vehicle communicatively coupled to the game server and configured to move passengers along a ride path, wherein the ride vehicle comprises:
one or more output devices configured to present the virtual environment to the passengers of the ride vehicle based on the game data generated by the game server;
one or more input devices configured to collect input data from the passengers of the ride vehicle;
one or more sensors configured to collect sensor data during operation of the ride vehicle; and
a programmable logic controller (PLC) communicatively coupled to the one or more input devices and the one or more sensors, wherein the PLC is configured to receive and conditionally execute instructions of a dynamic ride profile relative to one or more stored limits to operate physical actions of the ride vehicle; and
a dynamic ride profile server communicatively coupled to the game server and the PLC, wherein the dynamic ride profile server is configured to:
receive the input data and the sensor data via the PLC and receive the game data from the game server;
provide the input data, the sensor data, and the game data as inputs to one or more physical models to generate a portion of the dynamic ride profile; and
provide the portion of the dynamic ride profile to the PLC for conditional execution.

10. The amusement park ride of claim 9, wherein the one or more output devices comprise displays, speakers, haptic feedback devices, physical effects devices, or a combination thereof.

11. The amusement park ride of claim 9, wherein the one or more sensors comprise a positional sensor, a radio-frequency identification (RFID) sensor, a camera, a light detection and ranging (LIDAR) sensor, a velocimeter, an accelerometer, a gyroscope, a revolutions per minute (RPM) sensor, a voltage/current sensor, or a combination thereof.

12. The amusement park ride of claim 9, wherein the one or more input devices comprise a button, a steering device, a control pedal, a gear shift, a brake lever, or a combination thereof.

13. The amusement park ride of claim 9, wherein the one or more input devices comprise a head or eye tracking system that monitors passengers' head or eye position to collect steering input from the passengers.

14. The amusement park ride of claim 9, wherein the PLC of the ride vehicle is communicatively coupled to and controls a speed controller, a rotation controller, a drive, or a combination thereof, of the ride vehicle based on the portion of the dynamic ride profile and the one or more stored limits.

15. The amusement park ride of claim 9, wherein the one or more stored limits comprise maximum/minimum speed limit, an acceleration limit, a yaw limit, a tilt limit, a current/voltage limit, a torque limit, a minimum intravehicular distance, or a combination thereof.

16. A method of controlling an amusement park ride, comprising:
receiving input data from input devices of a ride vehicle of the amusement park ride;
receiving sensor data from one or more sensors of the amusement park ride;
receiving game data from a game server of the amusement park ride, wherein the game data describes movement of a virtual vehicle through a virtual environment;
providing the input data, the sensor data, and the game data as inputs to one or more physical models to generate a portion of a dynamic ride profile based on the movement of the virtual vehicle through the virtual environment; and
providing the portion of the dynamic ride profile to a communicatively coupled PLC of the ride vehicle, wherein the PLC of the ride vehicle is configured to conditionally execute the portion of the dynamic ride profile during operation of the amusement park ride to physically move the ride vehicle based on one or more stored limits of the PLC.

17. The method of claim 16, comprising:
receiving second input data from input devices of a second ride vehicle of the amusement park ride;
receiving the game data from a game server of the amusement park ride, wherein the game data also describes movement of a second virtual vehicle through the virtual environment;
providing the second input data, the sensor data, and the game data as inputs to the one or more physical models to generate a portion of a second dynamic ride profile based on the movement of the second virtual vehicle through the virtual environment; and
providing the portion of the second dynamic ride profile to a communicatively coupled second PLC of the second ride vehicle, wherein the second PLC of the second ride vehicle is configured to conditionally execute the portion of the second dynamic ride profile during operation of the amusement park ride based on one or more stored limits of the second PLC.

18. The method of claim 17, comprising generating game data that describes interactions between the virtual vehicle and the second virtual vehicle in the virtual environment, wherein the interactions comprise drafting effects, collisions, or projectile attacks.

19. The method of claim 18, wherein the one or more physical models comprise physical models defining how the ride vehicle and the second ride vehicle should move in response to the interactions.

20. The method of claim 16, wherein the game data describes the virtual vehicle transitioning between a first medium and a second medium in the virtual environment, and comprising:

using a first of the one or more physical models to generate the portion of the dynamic ride profile before the transition and to use a second of the one or more physical models to generate the portion of the dynamic ride profile after the transition.

\* \* \* \* \*